Nov. 14, 1933.  E. H. SMYTHE  1,935,300
SOUND REPRODUCING SYSTEM
Filed Sept. 13, 1930  2 Sheets-Sheet 1
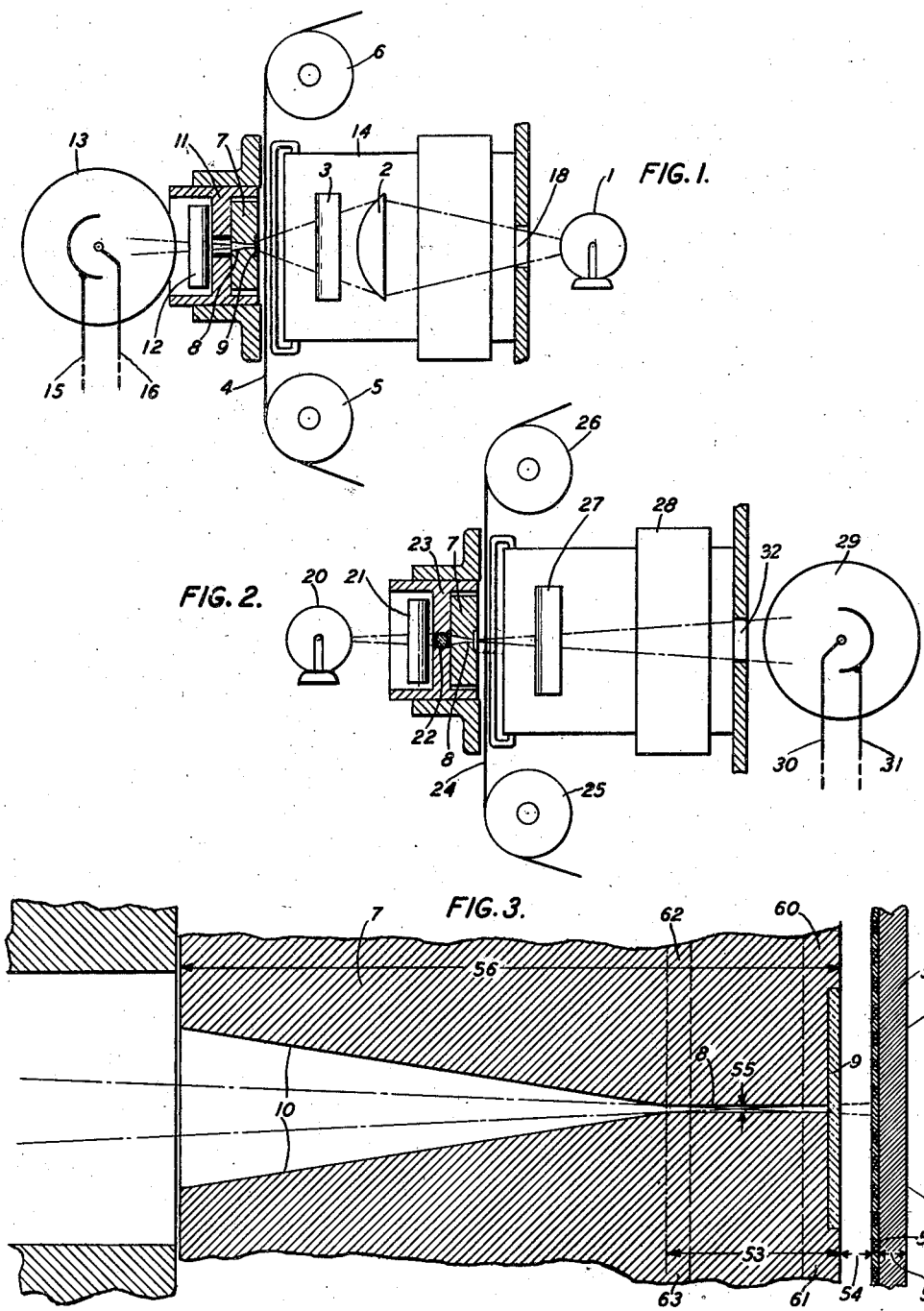
INVENTOR
E. H. SMYTHE
BY
G. H. Heydt
ATTORNEY

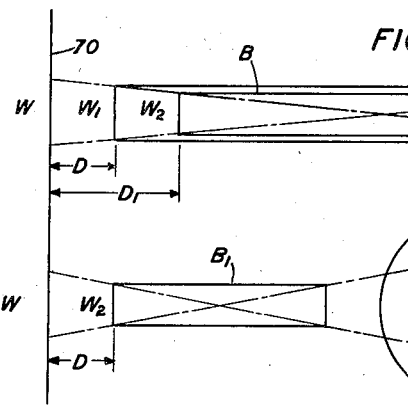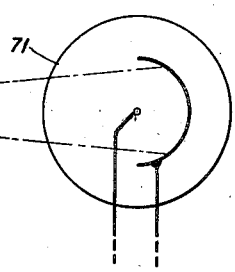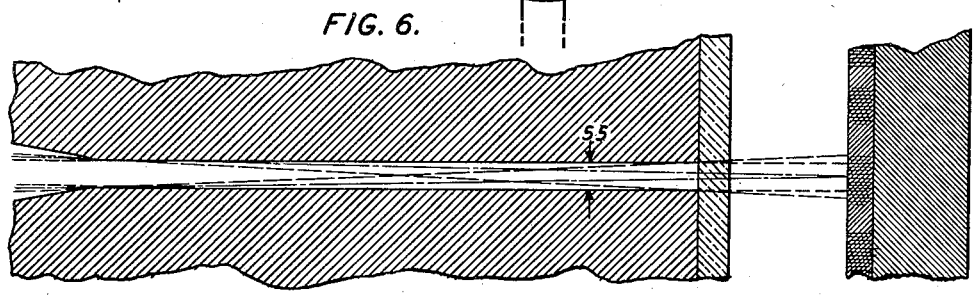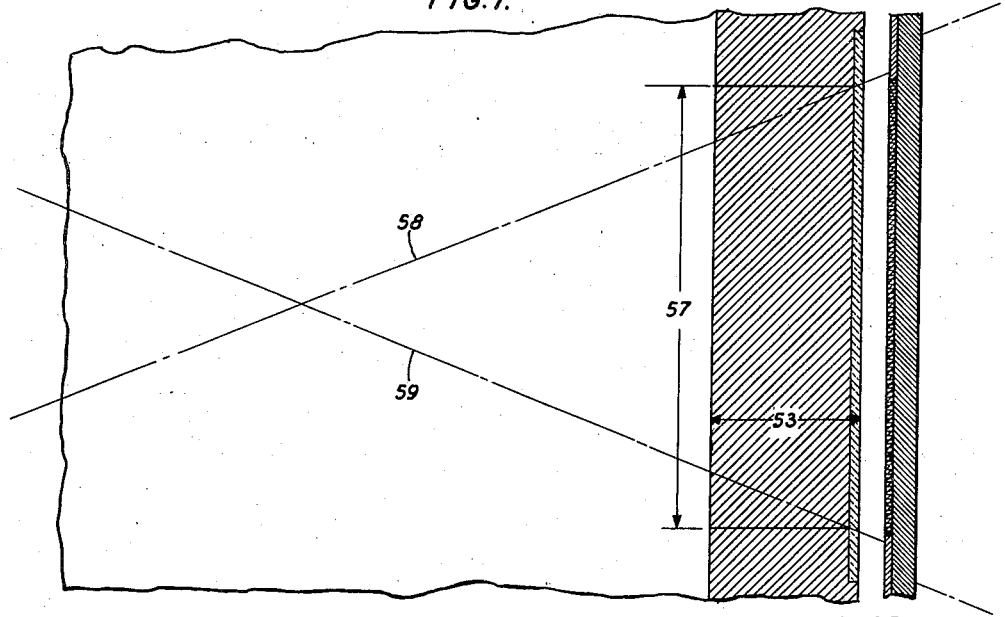

Patented Nov. 14, 1933

1,935,300

UNITED STATES PATENT OFFICE 1,935,300

SOUND REPRODUCING SYSTEM

Edwin H. Smythe, Evanston, Ill., assignor to Bell Telephone Laboratories, Incorporated, New York, N. Y., a corporation of New York Application September 13, 1930
Serial No. 481,731

6 Claims. (Cl. 179—100.31)

This invention relates to improved apparatus for reproducing sound which has been photographically recorded on a film.

In a number of sound picture systems in use at the present time the reproducing of sound photographically recorded on a film is accomplished by projecting light rays of constant intensity to an opaque screen containing a slit, beyond which the film is constantly in motion. The light is projected through the slit and the film to a light sensitive cell for transformation of the light variations due to the variations in density of the film into correspondingly varying electric currents, which currents, after amplification, are transmitted to a loud speaker.

The frequency range of sound recorded on the film that may be reproduced is determined by the speed of the film and the width of the slit in the direction of movement of the film. For a given speed of travel of the film, the narrower the slit the higher the recorded sound frequencies that may be reproduced.

Heretofore the so-called physical slit or contact slit, in order that it may function properly in effecting the resolution of the photographic sound record on the film, has been placed so close to the surface of the film as to be practically in rubbing contact. Such rubbing engagement between the film and the slit block tends to mar the surface of the film and also to clog the slit with dust and abraded fragments of the emulsion. When, to overcome this difficulty, the slit is withdrawn from substantially physical contact with the film, the slit largely loses its light restricting and defining function and its ability to effect a resolution of the higher recorded frequencies.

The object of this invention is to provide a sound reproducing system in which the area of the film sound record instantaneously active in the reproduction of sound from the photographic record is determined by a tubular slot that is sufficiently removed from the film surface to be free of the difficulties arising from rubbing engagement, and yet maintains the power to define sharply the narrow area necessary for the resolution of the high frequencies.

In accordance with one embodiment of this invention the tubular slot is placed between the exciting lamp and the film. In another embodiment the tubular slot is placed between the film and the light sensitive cell which translates the light variations into corresponding electric variations. In each case, the slot is so formed that its height or inside dimension in the direction of travel of the film is substantially equal to the corresponding dimension of the area of the film that it is desired to render active. The length of the slot, in the direction of the passage of light through it, is relatively great as compared with its height, so that the angle comprehended between the lines drawn through diagonally opposite front and rear top and bottom edges of the slit shall be very acute. In consequence of this relation obtained by making the slot long as compared to its height it becomes possible to withdraw the end of the slot far enough away from the film to prevent the possibility of harmful reactions of the slot and film upon each other, and at the same time to sharply limit and define the dimension of the active area lengthwise of the direction of movement of the film.

Furthermore the acute angle at which the light rays pass through the film have the effect of increasing the depth of focus and preventing normal deviations of the film from its flat plane of movement from affecting the frequency resolving power of the beam of light and varying the range of recorded frequencies that can be reproduced.

The reduction of light operative upon the light sensitive cell that results from the smaller angle at which the light passes through the film in the narrower dimension of the slit is partially compensated for by employing a very wide angle for the light passing through the film and the slot in the wide dimension of the slot. Moreover the effectiveness of the total light passing through the slot is increased by using a light sensitive cell of especially great sensitivity, such as the so-called cæsium cell.

Internal reflections of light from the top and bottom walls of the slot would have the effect of broadening the angle at which the light passes through the film, and therefore decreasing to some extent the sharp definition of the active area of the film in the direction of its travel. For this reason the top and bottom walls of the slot are blackened or made light absorbent to prevent such reflection.

In the drawings Fig. 1 is a view partly in section and partly in diagram of the apparatus for reproducing sound photographically recorded on film with the slot or tube according to this invention, placed between the film and the light sensitive cell.

Fig. 2 is a similar view showing a modified form of the sound reproducing system with the slot or tube placed between the film and the light source.

Fig. 3 is a sectional view of the slot or tube greatly enlarged.

Figs. 4 and 5 illustrate diagrammatically slots or tubes of various sizes.

Figs. 6 and 7 show additional views of the slot, partly in section.

In Fig. 1 the lamp 1 is a suitable light source for projecting light through the lens 2 and the lens 3 to the film 4. The light from light source 1 passes into the envelope 14 through the aperture 18. Lens 2 is provided for converging the light rays at a large angle upon a somewhat restricted area of the film in the direction of the travel of the film. Lens 3 is a cylindrical lens turned at right angles to lens 2. Lens 3 is used for the purpose of converging the light rays in a direction at right angles to the rays converged by lens 2. The light rays are converged in a solid angle is both dimensions of the sound track. The area of the film illuminated however is not restricted to the area from which light is projected to the light sensitive cell. Since the intensity of light in the line of light projected upon the film is a direct function of the solid angle of the light at the film, it is found that this lens system is very efficient for supplying a high intensity of light at the slot or tube entrance formed in the framework 7.

The film 4 is maintained in constant motion by the constantly rotating sprocket 5. A guide roller 6 is provided for guiding the film to the aperture plate and through the light converged in a solid angle by lenses 2 and 3.

A typical slot or tube and framework therefor is shown greatly enlarged in Fig. 3 along with its relation to the film. The block 7 in which the slot or tube is formed is arranged to fit into the framework 11 and may be fastened to this framework with screws. The block 7 may be slotted at the screw holes in order to provide an adjustment of the block for properly positioning the slot or tube 8. The dimension 56 shown in Fig. 3 is made according to the corresponding dimension of the framework 11. The dimension 55 or height of the slot in the direction of travel of the film may be approximately 1 mil. A dimension 53 or length of the slot or tube may be approximately 27 mils. The end of the slot or tube nearest the light sensitive cell is somewhat larger than the angle of the light projected from the slot. A quartz or glass window 9 is placed in front of the slot to prevent the collection of dust particles in the opening of the slot. The dimension 54 or distance between the end of the slot and the emulsion side of the film may be approximately 5 mils. The emulsion side of the film 50 is shown at 51. This emulsion is approximately 1 mil in thickness and the body of the film is approximately 4 mils in thickness as shown at dimension 52 making a total of 5 mils for the thickness of the film. The foregoing has been given as only one method of constructing the framework and slot according to the invention and any of the dimensions given including the dimension between the slot framework and the film may be changed without departing from the invention.

A plan view of the slot or tube is shown in Fig. 7. This view illustrates the width of the slot or tube in the direction of the lateral dimension of the sound record or film. The dimension 53 is 27 mils the same as shown in Fig. 3. The dimension 57 is approximately 80 mils which is the same as the effective width of the film sound track. The broad angle of the light rays projected through the slot are shown by the dotted lines 58 and 59.

Referring again to Fig. 1, the light rays projected through the slot or tube are projected through an aperture in the framework 11 and lens 12, to the light sensitive cell 13. Since in the lateral dimension of the tube the light rays are projected in a broad angle, the lens 12 is used for converging the rays toward the active element of the light sensitive cell. The light sensitive cell transforms the variations in light due to the variations in density of the film, into correspondingly varying electric currents which currents are transmitted over conductors 15 and 16 to a suitable amplifier not shown. After amplification, these electric currents are transmitted to a loud speaker not shown.

A diagram illustrating the passage of the light rays through the slot or tube is shown in Fig. 6. The height 55 or dimensions of the tube in the direction of travel of the film is approximately 1 mil the same as shown in Fig. 3.

An alternative arrangement of the invention is shown in Fig. 2 in which the slot or tube is placed between the light source and film 24. The lamp 20 is a suitable light source for illuminating the film. Lens 21 is used for converging the light rays in a broad angle laterally toward the film sound record. The lens 22 is of the round, elongated type such as a glass rod for converging the light rays toward the 1 mil vertical dimension of the slot or tube. The light rays from the light source 20 are thus converged in both directions to form a concentrated solid angle of light at the V-shaped entrance of the slot for projection through the slot 8 in the framework 7 and to the film sound record. The film 24 is maintained in constant motion by the continuously moving sound sprocket 25. The guide roller 26 guides the film to the aperture plate and through the light from the light source 20. The light rays are thus projected through a restricted area of the film approximately 1 mil in height and 80 mils in width through the lens 27 to the light sensitive cell 29. The aperture 32 in the envelope 28 permits the light rays to be projected to the active element of the light sensitive cell 29. The lens 27 is of the cylindrical type and is used for converging the light rays toward the active surface of the light sensitive cell 29.

In both embodiments of the invention as shown in Figs. 1 and 2, the slot or tube is maintained close to the emulsion side of the film. However, in consequence of the relation obtained by making the slot or tube long as compared to its height, it becomes possible to withdraw the end of the tube far enough away from the film to prevent the possibility of harmful reactions of the tube and film upon each other.

It is not necessary to adhere to the dimension of the slot or tube as given herein for the slot or tube in Figs. 3 and 7. As an example of the manner in which the dimensions of the tube may be varied, tubes of different length with the ends of the tubes different distances from the film, have been shown in Figs. 4 and 5. In these figures W is the height of the restricted area of the film 70 in the direction of film travel to be viewed by the light sensitive cell. Fig. 4 shows that two tubes of different dimensions will have the same restricting effect when placed at suitable distances from the film.

In Fig. 4 the tube B has been placed at a distance D1 from the film. The distance D1 is equal to twice the distance D from the end of tube A to the film. It will be noted that in order to provide the same definition, the vertical dimension of tube B is considerably smaller than the corresponding dimension of tube A. Due to this decreased vertical dimension the length of the tube B may be made less than that of A. This allows the photoelectric cell to be placed the same distance from the film. It is, of course, obvious that were tube B made with a vertical dimension equivalent to that of A and placed at a distance D1 from the film, the tube would have to be a great deal longer in order to provide the same definition. This would necessitate that the photoelectric cell be placed at a greater distance from the film. Conversely, if tube B maintains its vertical dimension W2 and is brought closer to the film so that it is within a distance D of the film, as shown in Fig. 5, then the tube may be considerably shorter than the tube of Fig. 4 without loss of definition. In this case, of course, it is possible to move the photoelectric cell 71 much closer to the film.

The length of the slot or tube causes the light rays to pass through the film at an acute angle. This has the effect of increasing the depth of focus and preventing the normal deviation of the film from a flat plane of movement from affecting the frequency resolving power of the beam of light and varying the range of recorded frequencies that can be reproduced. There is, however, some reduction in light resulting from the smaller angle at which the light passes through the film in the narrower dimensions of the slot or tube. This is, however, partly compensated for by employing a very wide angle for the light passing through the film and the slot or tube in the lateral dimension of the tube as shown in Fig. 7. Moreover, the effectiveness of the light passing through the slot or tube is increased by using a collecting lens such as 12 or 27 which collects the laterally dispersing rays and concentrates them on the photoelectric cell.

A modification of the tube or slot structure is shown in Fig. 3 in which elements 60 and 61 (shown in dotted lines) may form one slit at a given distance from the emulsion side of the film and elements 62 and 63 (shown in dotted lines) form a second slit in alignment with the first slit formed by 60 and 61. The walls of the slits 60, 61, 62 and 63 may be held in position in any suitable manner, preferably by a tubular framework. The dimensions between the inner ends of the slits may be approximately 1 mil as given for dimension 55. The dimension between the outer surfaces of the slits may be 27 mils as given for dimension 53. A window 9 may be used in the slit nearest to the film to prevent the collection of dust in the slit.

What is claimed is:

1. Apparatus for reproducing sound photographically recorded on film comprising means adapted to move a film continuously, a constant intensity light source on one side of the film, a light sensitive cell on the other side of said film, and a member having an elongated slot bounded by non-reflecting top and bottom walls between said film and said light sensitive cell of sufficient length, height and width to permit the proximate end of said slot to be positioned out of rubbing engagement with the film, the dimensions of said slot being such as to limit to a narrow angle the light rays passing through said slot in the plane of direction of movement of said film, and to permit the passage of light at a wide angle through said slot transverse to the direction of movement of said film.

2. Apparatus for reproducing sound photographically recorded on film comprising means adapted to move a film continuously, a constant intensity light source on one side of the film, a light sensitive cell on the other side of said film, and a member having an elongated tubular slot bounded by non-reflecting top and bottom walls between said film and said cell of sufficient length, height and width to permit the proximate end of said slot to be positioned out of rubbing engagement with the film, the height of said slot being less than the dimension of the portion of the sound track in the direction of film travel to be viewed by said cell, the length of said slot being relatively great as compared with the slot height, and the width of the slot at the end closest to the film being approximately the same as the lateral dimension of the sound track said dimensions being regulated according to the distance between said member and the near surface of said film.

3. Apparatus for reproducing sound photographically recorded on film comprising means adapted to move a film continuously, a constant intensity light source on one side of the film, a light sensitive cell on the other side of said film, and an elongated tubular slot between said light source and said cell, said slot being bounded by non-reflecting top and bottom walls, separated by a distance approximately the same as the portion of the sound track in the direction of the film travel to be rendered active, said slot having a length relatively great as compared with the distance between said walls.

4. Film viewing means for photographic sound reproducing mechanism comprising means adapted to move a film continuously, said film having a sound record thereon, a light source on one side of the film, a light sensitive cell on the opposite side of said film, and a member provided with a slot mounted between said cell and said film having non-reflecting top and bottom walls said member and slot being of sufficient length, height and width to permit the proximate end of said slot to be positioned out of rubbing engagement with the film, the top and bottom surfaces of said slot lying in approximately parallel planes and spaced apart a distance less than the portion of the sound track in the direction of film travel to be viewed, the side walls of said slot being spaced apart a distance approximately the same as the lateral dimension of the sound track to provide for a wide angle of divergence in the rays of light in a plane transverse to the direction of movement of the film and the length of said slot being such as to limit to an acute angle the light passing through said slot in the plane of movement of said film and being dependent upon the distance from the proximate end of the slot to the near surface of the film.

5. Apparatus for reproducing sound photographically recorded on film comprising means adapted to move a film continuously, a constant intensity light source on one side of the film, a light sensitive cell on the other side of said film, and a member having an elongated slot bounded by non-reflecting top and bottom walls positioned between said film and said light sensitive cell far enough away from the near surface of the film to be out of contact with a regular or iregular surface of said film, the length and cross-sectional dimensions of the slot being regulated by the distance between the end of the slot and the near surface of the film to provide for excitation of said cell by light projected through a given area of said film sound record.

6. Apparatus for reproducing sound photographically recorded on film comprising means adapted to move a film continuously, a constant intensity light source on one side of the film, a light sensitive cell on the other side of said film, and a member having an elongated slot bounded by non-reflecting top and bottom walls positioned between said film and said light sensitive cell at least five mils away from the near surface of the film, the length and cross-sectional dimensions of the slot being regulated by the distance between the end of the slot and the near surface of the film to provide for excitation of said cell by light projected through a given area of said film sound record.

EDWIN H. SMYTHE.